Figure 1:
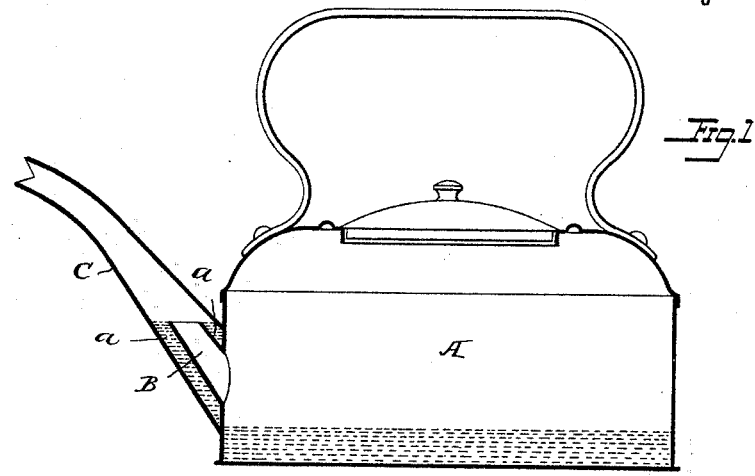

(No Model.)

J. R. WILKINSON.
KETTLE.

No. 497,935. Patented May 23, 1893.

Witnesses
A. N. Dobson
Charles E. Fraser

Inventor
James R. Wilkinson
By Foster Freeman
Attorneys ized/
UNITED STATES PATENT OFFICE.

JAMES REEVE WILKINSON, OF ADDINGTON, NEW ZEALAND.

KETTLE.

SPECIFICATION forming part of Letters Patent No. 497,935, dated May 23, 1893.

Application filed January 4, 1892. Serial No. 417,043. (No model.)

*To all whom it may concern:*

Be it known that I, JAMES REEVE WILKINSON, residing at Addington, in the provincial district of Canterbury and Colony of New Zealand, have invented certain new and useful Improvements in Kettles and other Vessels Intended for Boiling Water or other Liquid, of which the following is a specification.

With kettles and other vessels intended for boiling water or other liquid that have their spouts attached with solder or made with a soldered seam there is always a great risk of the solder becoming melted by the heat of the fire over or against which, such kettles or other vessels may be placed, when the said kettles or other vessels are only partially filled thereby causing leakage and not unfrequently causing the spout to become disconnected.

Now the object of my invention is to prevent to a considerable extent the solder, which connects the spout to the kettle or other vessel or is used in the seam of the spout, from melting and thereby practically to secure the kettle or other vessel against risk of leaking or becoming disconnected by the heat of the fire over or against which it may be placed. I attain this object as follows: Before attaching the ordinary spout to the kettle or other vessel, I attach a shorter upturned spout of suitable size according to size of said kettle or other vessel. I then attach the ordinary spout by soldering in the usual manner, surrounding the said shorter spout and leaving a space between the two and below the open upper end of the shorter upturned spout whereby there is constituted a trap which forms a water seal entirely covering the line of solder uniting the ordinary spout with the kettle. When the kettle or other vessel having these two spouts attached is only partially filled with water or other liquid, and is required to be placed upon or against the fire, it is only necessary to cover the mouth of the outer spout with the finger and tip the kettle or other vessel forward, whereupon the said outer spout will more or less fill with the water or other liquid contained in the said kettle or other vessel, but upon slowly letting back the said kettle or other vessel the interspace will become filled, while the surplus water or other liquid will flow back into said kettle or other vessel, which may now be placed upon or against the fire without risk of leakage being caused in the outer spout or at its place of attachment until the water contained in the interspace is more or less boiled away. The said inner spout may be made of any required shape, and to suit any required size of kettle or other vessel. The expense of the said inner spout will add very little to the cost of the kettle or other vessel to which it may be attached and allow more freedom in use.

In order that my invention may be better understood I will now proceed to describe the same by reference to the annexed sheet of drawings illustrating same, in which—

Figure 2:
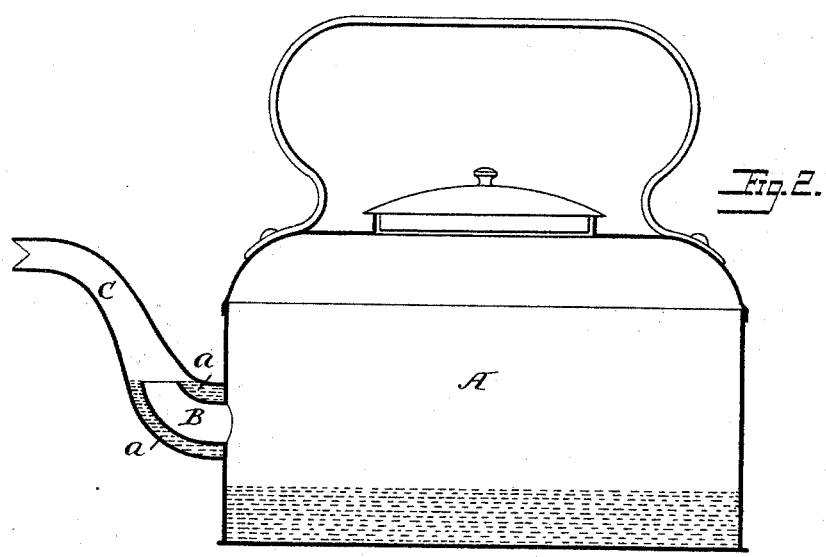
Figure 3:
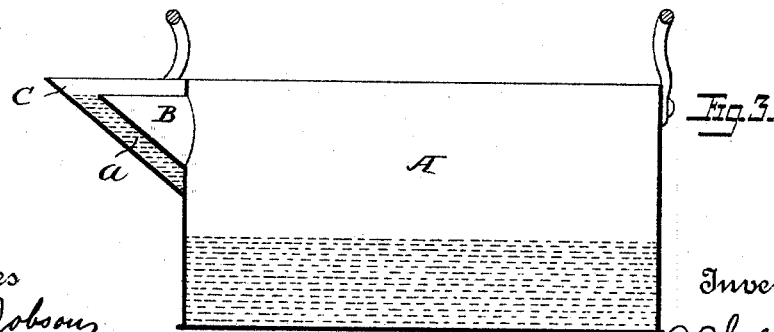

Figure 1 represents a sectional view of a kettle having a straight spout and showing the position of the inner spout. Fig. 2 represents a sectional view of a kettle having a bent spout and the position of the inner spout. Fig. 3 represents a sectional view of an open boiler with V shaped spout showing the position of the inner spout.

The same letters of reference indicate corresponding parts in each figure.

A is the kettle or boiler.

B is the short inner upturned spout soldered to kettle.

C is the ordinary spout soldered to kettle in the usual manner but of larger size than, and surrounding the inner spout, leaving a space $a$ between the two, and below the upper open end of the spout B which space can be readily filled with water or other liquid contained in the said kettle or other vessel by placing the finger over the mouth of the said ordinary spout, tilting the said kettle or other vessel forward and then back again, the surplus water or liquid flowing back into said kettle or other vessel, forming a water seal which entirely covers the line of solder uniting the larger spout with the vessel. It will thus be seen that so long as a portion of the space $a$ contains water or other liquid, the solder contiguous to that portion cannot melt by the heat of the fire, thus very materially lessening the risk of leakage or the liability of the spout becoming disconnected.

It will be seen that by means of the construction which I have described there is constituted a trap in the spout which causes a water seal to be formed surrounding the entire line of solder which unites the spout C with the body of the kettle or other vessel, this trap being formed by reason of the fact that the upper end of the small spout B is above the upper portion of the line of solder.

Having now particularly described and ascertained the nature of my said invention and in what manner the same is to be performed, I declare that what I claim, and desire to secure by Letters Patent, is—

A kettle provided with an inner upturned spout secured thereto and a larger outer spout soldered to the kettle and surrounding the inner spout, the open end of the inner spout being above the line of solder uniting the outer spout with the kettle, whereby there is formed a trap adapted to form a water seal which entirely covers the line of solder between the outer spout and the body of the kettle, substantially as described.

In testimony whereof I have signed my name to this specification in the presence of two subscribing witnesses.

JAMES REEVE WILKINSON.

Witnesses:
ADA WILKINSON,
KATE WALKER.